United States Patent
Blea et al.

(10) Patent No.: US 10,013,324 B2
(45) Date of Patent: Jul. 3, 2018

(54) DATA RECOVERY IN MULTI-TARGET DATA STORAGE NETWORKS

(71) Applicant: International Business Machines Corporation, Armonk, NY (US)

(72) Inventors: David R. Blea, Round Rock, TX (US); Theresa M. Brown, Tucson, AZ (US); Gregory E. McBride, Vail, AZ (US); Carol S. Mellgren, Tucson, AZ (US); Warren K. Stanley, Loveland, CO (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 14/960,277

(22) Filed: Dec. 4, 2015

(65) Prior Publication Data
US 2017/0161162 A1    Jun. 8, 2017

(51) Int. Cl.
*G06F 11/20*    (2006.01)

(52) U.S. Cl.
CPC ...... *G06F 11/2094* (2013.01); *G06F 11/2069* (2013.01); *G06F 11/2082* (2013.01)

(58) Field of Classification Search
CPC ............. G06F 11/2069; G06F 11/2082; G06F 11/2094
See application file for complete search history.

(56) References Cited

U.S. PATENT DOCUMENTS

| | | | |
|---|---|---|---|
| 6,266,784 B1 | 7/2001 | Hsiao et al. | |
| 7,194,487 B1 | 3/2007 | Kekre et al. | |
| 7,246,214 B2 * | 7/2007 | Nakano | G06F 11/2058 707/999.202 |
| 7,426,617 B2 | 9/2008 | Stager et al. | |
| 7,627,729 B2 * | 12/2009 | Bartfai | G06F 11/2058 711/162 |
| 7,644,300 B1 | 1/2010 | Rao | |
| 8,676,750 B2 | 3/2014 | Bitar et al. | |

(Continued)

OTHER PUBLICATIONS

Blea et al., U.S. Appl. No. 15/679,036, filed Aug. 16, 2017.
(Continued)

*Primary Examiner* — Joseph R Kudirka
(74) *Attorney, Agent, or Firm* — Zilka-Kotab, P.C.

(57) ABSTRACT

In one general embodiment, a computer-implemented method includes using a supplemental data storage volume at a secondary location to track a first set of data updates to a primary data storage volume at a primary location in response to a failure event at the primary location. A second set of tracked data updates, which are updates to the primary data storage volume stored in a secondary data storage volume at the secondary location, are retrieved. The second set of tracked data updates is merged into the first set of tracked data updates in the supplemental data storage volume. The merged data updates are transitioned from the supplemental data storage volume at the secondary location to the primary data storage volume at the primary location. The secondary data storage volume is used to track further data updates to the primary data storage volume made at the primary location.

20 Claims, 7 Drawing Sheets

To FIG. 5B (56) References Cited

U.S. PATENT DOCUMENTS

| | | | |
|---|---|---|---|
| 8,799,602 B2* | 8/2014 | Blea | G06F 11/2069 |
| | | | 711/162 |
| 9,152,650 B1 | 10/2015 | Raj et al. | |
| 9,547,552 B2 | 1/2017 | Segura et al. | |
| 2005/0193244 A1 | 9/2005 | Stager et al. | |
| 2009/0158080 A1 | 6/2009 | Furuya et al. | |
| 2011/0208694 A1 | 8/2011 | Bitar et al. | |
| 2015/0301906 A1* | 10/2015 | Crockett | G06F 11/1466 |
| | | | 714/19 |
| 2016/0170833 A1 | 6/2016 | Segura et al. | |
| 2017/0344446 A1 | 11/2017 | Blea et al. | |
| 2018/0107573 A1 | 4/2018 | Blea et al. | |

OTHER PUBLICATIONS

List of IBM Patents or Patent Applications Treated As Related.
Non-Final Office Action from U.S. Appl. No. 15/679,036, dated Oct. 13, 2017.
Blea et al., U.S. Appl. No. 15/842,765, filed Dec. 14, 2017.
Notice of Allowance from U.S. Appl. No. 15/679,036, dated Mar. 5, 2018.
Notice of Allowance from U.S. Appl. No. 15/842,765, dated Mar. 30, 2018.
Corrected Notice of Allowance from U.S. Appl. No. 15/679,036, dated Apr. 18, 2018.

* cited by examiner

DATA RECOVERY IN MULTI-TARGET DATA STORAGE NETWORKS

BACKGROUND

The present invention relates to data storage systems, and more specifically, this invention relates to recovery of data across a data storage system.

Data storage systems, e.g., networks, allow for data to potentially be stored in multiple different storage sites and/or across multiple storage devices. Despite being stored in various locations, all, subsets, some, etc. of the data included in a data storage system may be accessed from a plurality of different locations, e.g., terminals.

The development of multi-target peer-to-peer remote copy (PPRC) has introduced data storage network configurations which are able to perform multi-target metro/global mirror (MGM) operations. However, such developments have also introduced added complexity. When multi-target environments are introduced, processes such as failure recovery become more complicated. Previous implementations have resorted to making unnecessary duplicate copies of data across long distance links in order to perform data recovery, which again increases inefficiency.

SUMMARY

A computer-implemented method according to one embodiment includes using a supplemental data storage volume at a secondary location to track a first set of data updates to a primary data storage volume at a primary location in response to a failure event at the primary location. A second set of tracked data updates are retrieved, the second set of tracked data updates being updates to the primary data storage volume stored in a secondary data storage volume at the secondary location. The second set of tracked data updates is merged into the first set of tracked data updates in the supplemental data storage volume. The merged data updates are transitioned from the supplemental data storage volume at the secondary location to the primary data storage volume at the primary location. The secondary data storage volume at the secondary location is used to track further data updates to the primary data storage volume made at the primary location.

A computer program product, according to one embodiment, includes a computer readable storage medium having program instructions embodied therewith, the program instructions readable and/or executable by a computer to cause the computer to use, by the computer, data storage volumes at a secondary location to track data updates to a primary data storage volume at a primary location in response to a failure event at the primary location, wherein the data storage volumes include a supplemental data storage volume and a secondary data storage volume. The program instructions are also readable and/or executable by the computer to cause the computer to transition, by the computer, the tracked data updates from the data storage volumes at the secondary location to the primary data storage volume at the primary location; quiesce, by the computer, data updates to the primary data storage volume; determine, by the computer, whether all of the tracked data updates have transitioned from the data storage volumes at a secondary location to the primary data storage volume at the primary location; copy, by the computer, data stored in the supplemental data storage volume to the secondary data storage volume in response to determining that all of the tracked data updates have transitioned from the data storage volumes at the secondary location to the primary data storage volume at the primary location; and use, by the computer, the secondary data storage volume at the secondary location to track further data updates to the primary data storage volume made at the primary location.

A computer-implemented method according to yet another embodiment includes sending, by the computer, data updates to a secondary volume at a secondary location in response to a failure event at a primary location, wherein the data updates correspond to a primary data storage volume at the primary location. A single set of merged data updates is received from a supplemental data storage volume at the secondary location. The received set of merged data updates is implemented in the primary data storage volume at the primary location. Data updates are quiesced to the primary data storage volume. Data stored in the primary data storage volume is copied to a tertiary data storage volume at the primary location. A determination is made as to whether all of the merged data updates have been implemented in the primary data storage volume. Data updates to the primary data storage volume are received in response to determining that all of the merged data updates have been implemented in the primary data storage volume. The received data updates are sent to the secondary data storage volume at the secondary location.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for data recovery resulting from a failure event in a data storage network.

In one general embodiment, a computer-implemented method includes using a supplemental data storage volume at a secondary location to track a first set of data updates to a primary data storage volume at a primary location in response to a failure event at the primary location. A second set of tracked data updates are retrieved, the second set of tracked data updates being updates to the primary data storage volume stored in a secondary data storage volume at the secondary location. The second set of tracked data updates is merged into the first set of tracked data updates in the supplemental data storage volume. The merged data updates are transitioned from the supplemental data storage volume at the secondary location to the primary data storage volume at the primary location. The secondary data storage volume at the secondary location is used to track further data updates to the primary data storage volume made at the primary location.

In another general embodiment, a computer program product includes a computer readable storage medium having program instructions embodied therewith, the program instructions readable and/or executable by a computer to cause the computer to use, by the computer, data storage volumes at a secondary location to track data updates to a primary data storage volume at a primary location in response to a failure event at the primary location, wherein the data storage volumes include a supplemental data storage volume and a secondary data storage volume. The program instructions are also readable and/or executable by the computer to cause the computer to transition, by the computer, the tracked data updates from the data storage volumes at the secondary location to the primary data storage volume at the primary location; quiesce, by the computer, data updates to the primary data storage volume; determine, by the computer, whether all of the tracked data updates have transitioned from the data storage volumes at a secondary location to the primary data storage volume at the primary location; copy, by the computer, data stored in the supplemental data storage volume to the secondary data storage volume in response to determining that all of the tracked data updates have transitioned from the data storage volumes at the secondary location to the primary data storage volume at the primary location; and use, by the computer, the secondary data storage volume at the secondary location to track further data updates to the primary data storage volume made at the primary location.

In another general embodiment, a computer-implemented method includes sending, by the computer, data updates to a secondary volume at a secondary location in response to a failure event at a primary location, wherein the data updates correspond to a primary data storage volume at the primary location. A single set of merged data updates is received from a supplemental data storage volume at the secondary location. The received set of merged data updates is implemented in the primary data storage volume at the primary location. Data updates are quiesced to the primary data storage volume. Data stored in the primary data storage volume is copied to a tertiary data storage volume at the primary location. A determination is made as to whether all of the merged data updates have been implemented in the primary data storage volume. Data updates to the primary data storage volume are received in response to determining that all of the merged data updates have been implemented in the primary data storage volume. The received data updates are sent to the secondary data storage volume at the secondary location.

Figure 1:
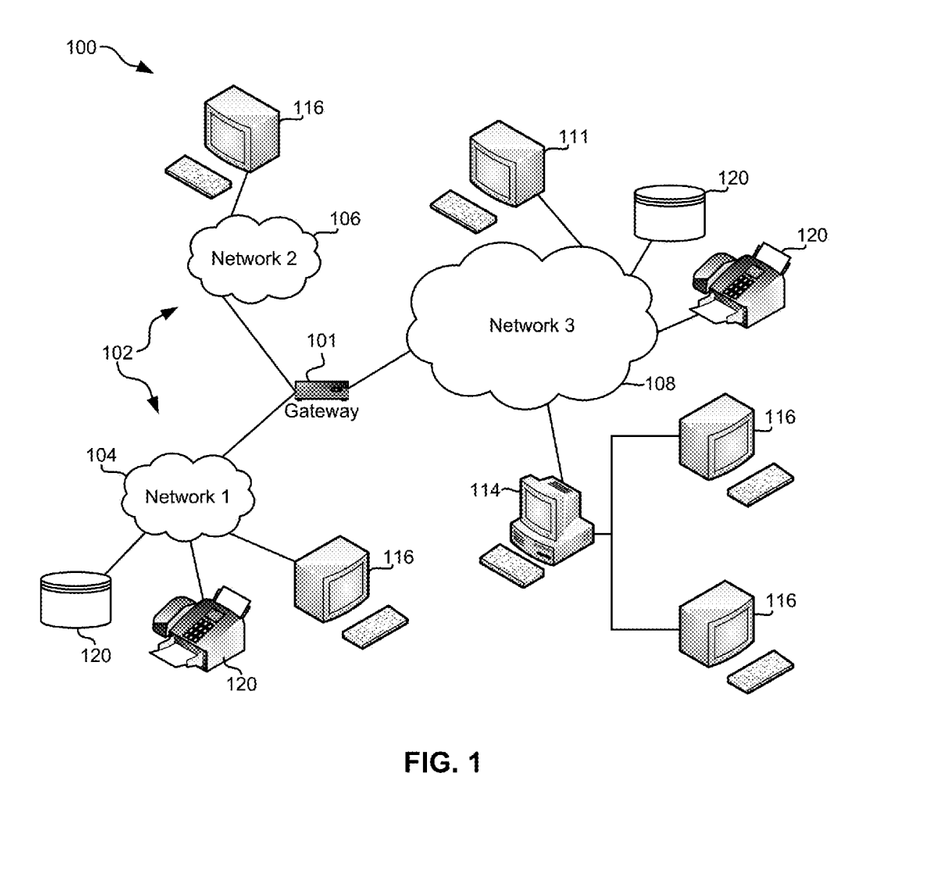
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
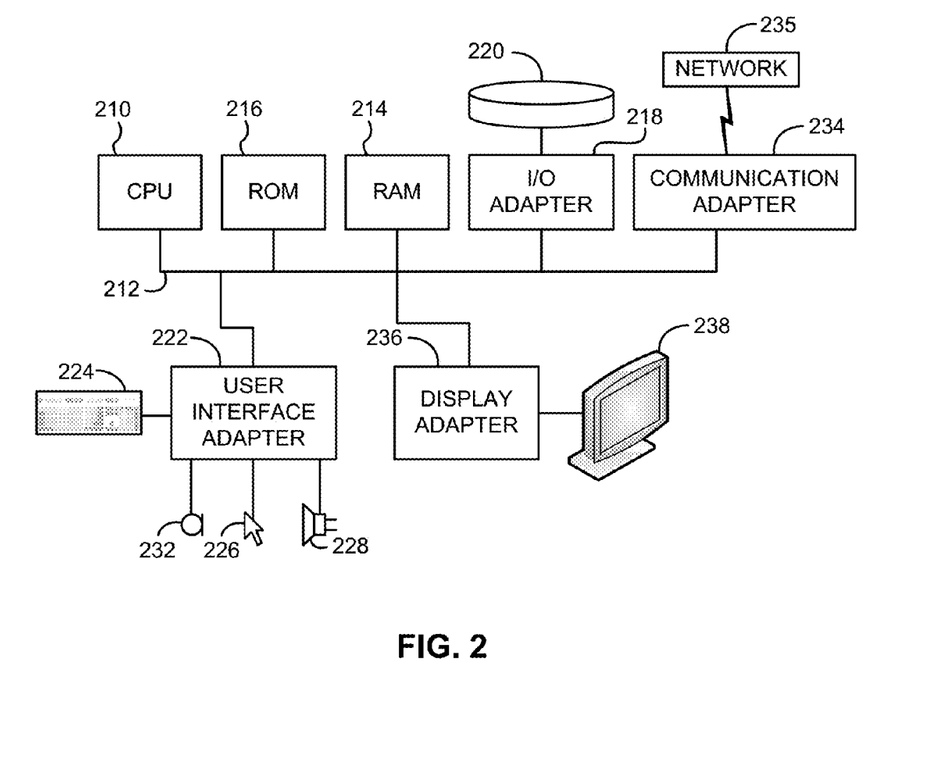
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
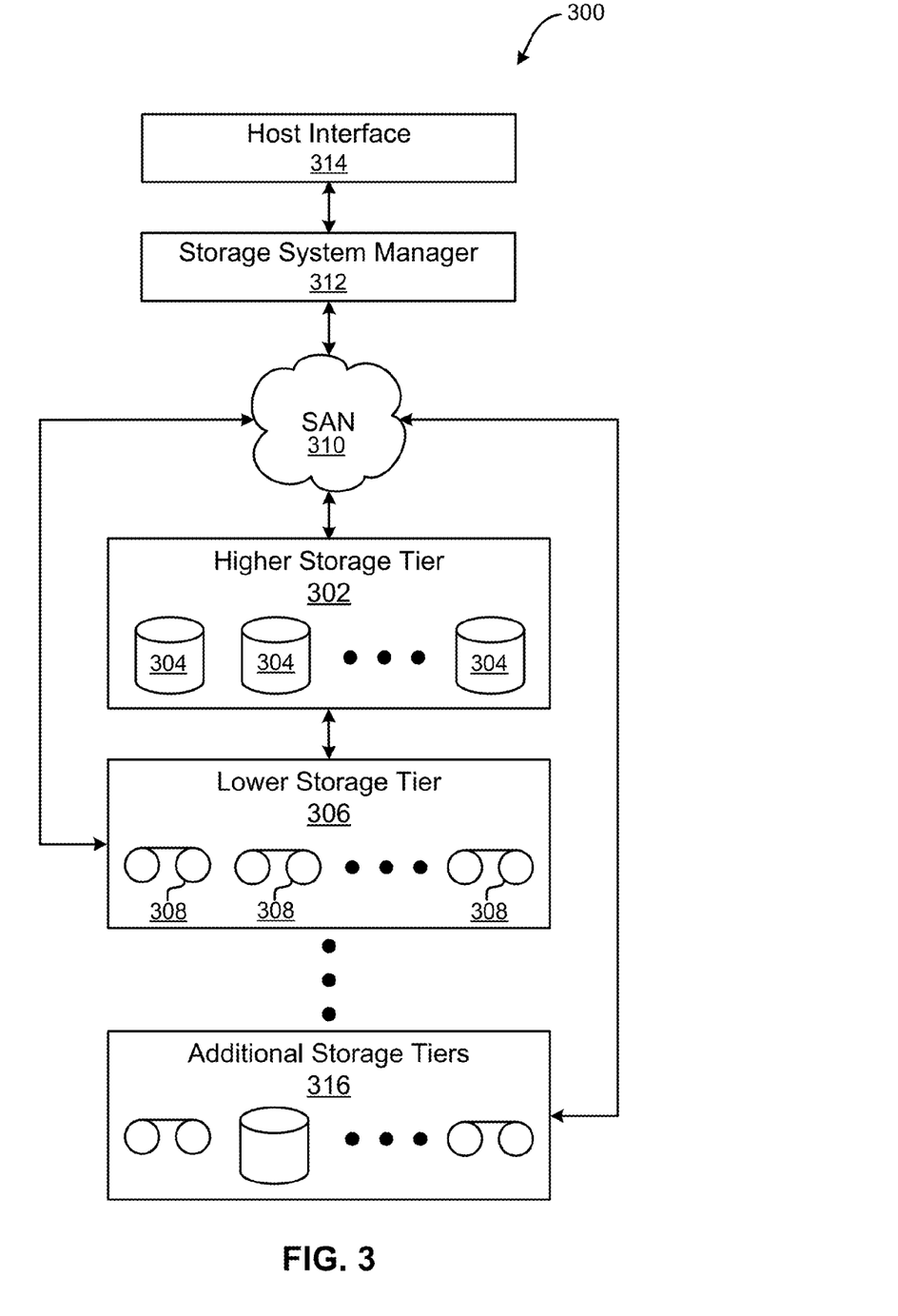
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

The development of multi-target peer-to-peer remote copy (PPRC) has introduced configurations which are able to perform multi-target metro/global mirror (MGM) operations. However, such developments have also introduced added complexity, and as a result, previous attempts to implement such developments have been largely inefficient.

When multi-target environments are introduced, processes such as failure recovery become more complicated. For instance, a recovery to a target at a given remote site uses a set of volumes that are not part of the remote copy relationships and thus cannot be used alone to simply recover data at the originally failed site, e.g., once it is repaired. Previous implementations have resorted to making unnecessary duplicate copies of data across long distance links in order to perform data recovery, which again increases inefficiency.

In sharp contrast, embodiments described herein may be able to perform efficient failure recoveries for multi-target systems, e.g., such that duplicate copies of data are not made and resources are preserved, as will be described in further detail below.

Figure 4:
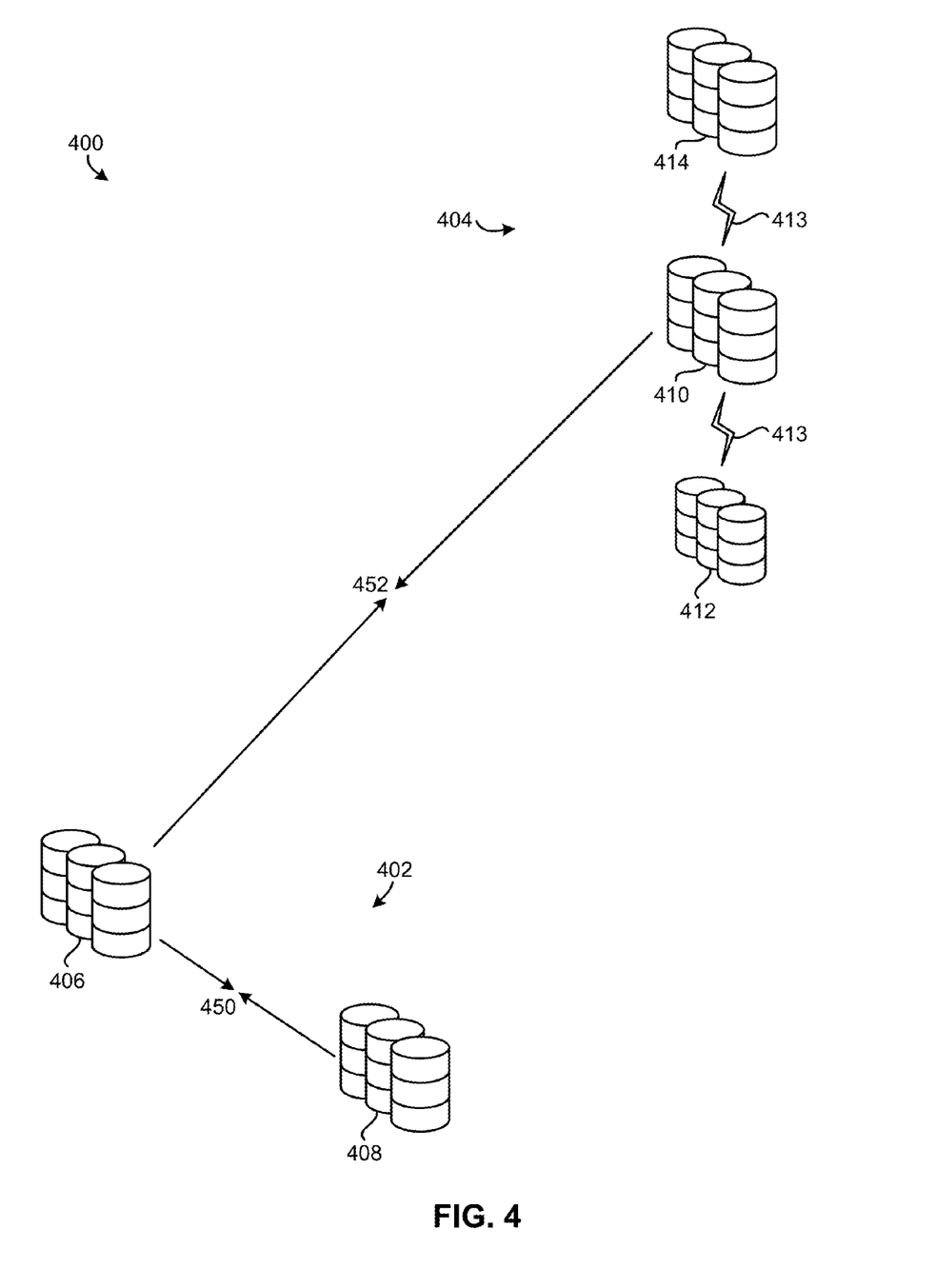
FIG. 4 is a data storage network in accordance with one embodiment.

Looking to FIG. 4, a data storage network 400 is illustrated, in accordance with one embodiment. As an option, the present data storage network 400 may be implemented in conjunction with features from any other embodiment listed herein, such as those described with reference to the other FIGS., such as FIGS. 1-3. However, such data storage network 400 and others presented herein may be used in various applications and/or in permutations which may or may not be specifically described in the illustrative embodiments listed herein. Further, the data storage network 400 presented herein may be used in any desired environment. Thus FIG. 4 (and the other FIGS.) may be deemed to include any possible permutation.

As shown, data storage network 400 includes a primary location 402 and a secondary location 404. Secondary location 404 is preferably removed from (e.g., remote relative to) the primary location 402 in order to avoid a total data storage network 400 failure in the case that either locations 402, 404 experiences a failure event, e.g., a power loss.

Primary location 402 includes a primary data storage volume 406 and a tertiary data storage volume 408, which may be coupled using a short distance connection 450, e.g., at least relative to a long distance connection 452 between primary location 402 and secondary location 404. Moreover, a metro mirror relationship preferably exists between primary and tertiary volumes 406, 408, which establishes a short distance, synchronous replication relationship between the data storage volumes 406, 408, which has been represented by the opposite facing arrows as shown.

Secondary location 404 includes a secondary data storage volume 410 in addition to journal 412 and supplemental data storage volume 414. Journal 412 may be used to periodically store consistent copies of data on secondary data storage volume 410, e.g., which may be used to recover data after a failure event. Journal may store the consistent copies of data using journal entries and/or snapshots as would be appreciated by one skilled in the art upon reading the present description. Furthermore, in some approaches, supplemental data storage volume 414 may be a practice copy site, as will be described in further detail below.

Referring still to FIG. 4, secondary data storage volume 410 is coupled to journal 412 and supplemental data storage volume 414. According to preferred approaches, secondary data storage volume 410 is coupled to journal 412 and supplemental data storage volume 414 using a Flash copy connection 413, e.g., to increase the speed at which data may be transferred therebetween, but is in no way limited thereto. Moreover, secondary data storage volume 410 is also coupled to primary data storage volume 406 over a long distance connection 452, e.g., at least relative to short distance connection 450. A global copy relationship preferably exists between primary and secondary data storage volumes 406, 410, which establishes an asynchronous copy relationship, thereby keeping data storage volumes 406, 410 in-sync, which has been represented by the opposite facing arrows as shown.

In the event of a disaster (e.g., a power loss) at primary location 402, primary and tertiary data storage volumes 406, 408 may fail, thereby causing a campus failure at the primary location 402. Accordingly, steps are preferably taken to implement data storage operations at secondary location 404, e.g., to prevent inoperability of the network 400 as a whole. As mentioned above, some of the embodiments described herein include the ability to efficiently recover from a failure at a primary data storage location, and/or the ability to efficiently shift data storage back to a primary data storage location after recovering from a failure there, without making duplicate copies of data across long distance connections as plagued by previous attempts.

Figure 5A:
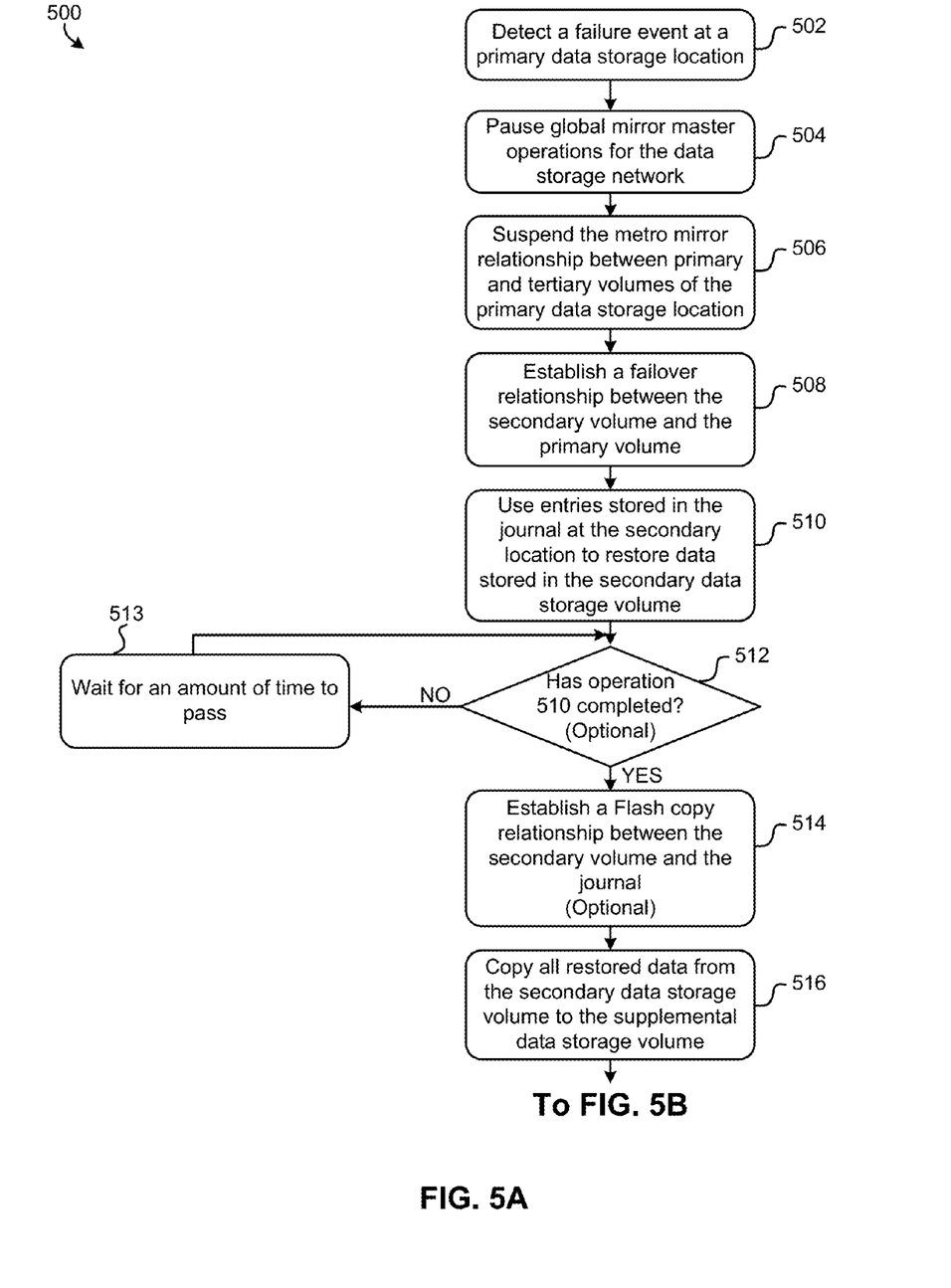
FIGS. 5A-5C are a flowchart of a method in accordance with one embodiment.
Figure 5B:
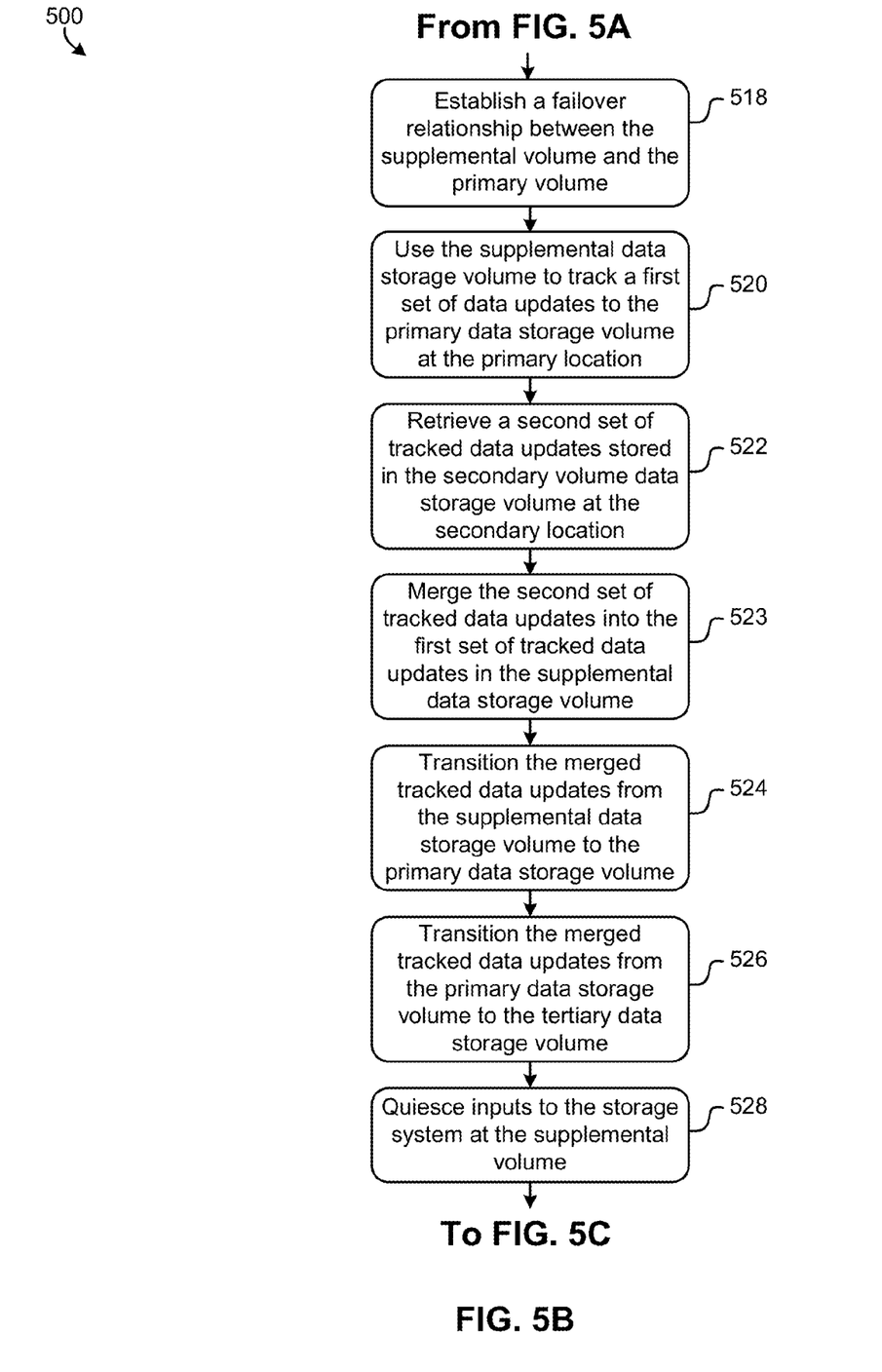
Figure 5C:
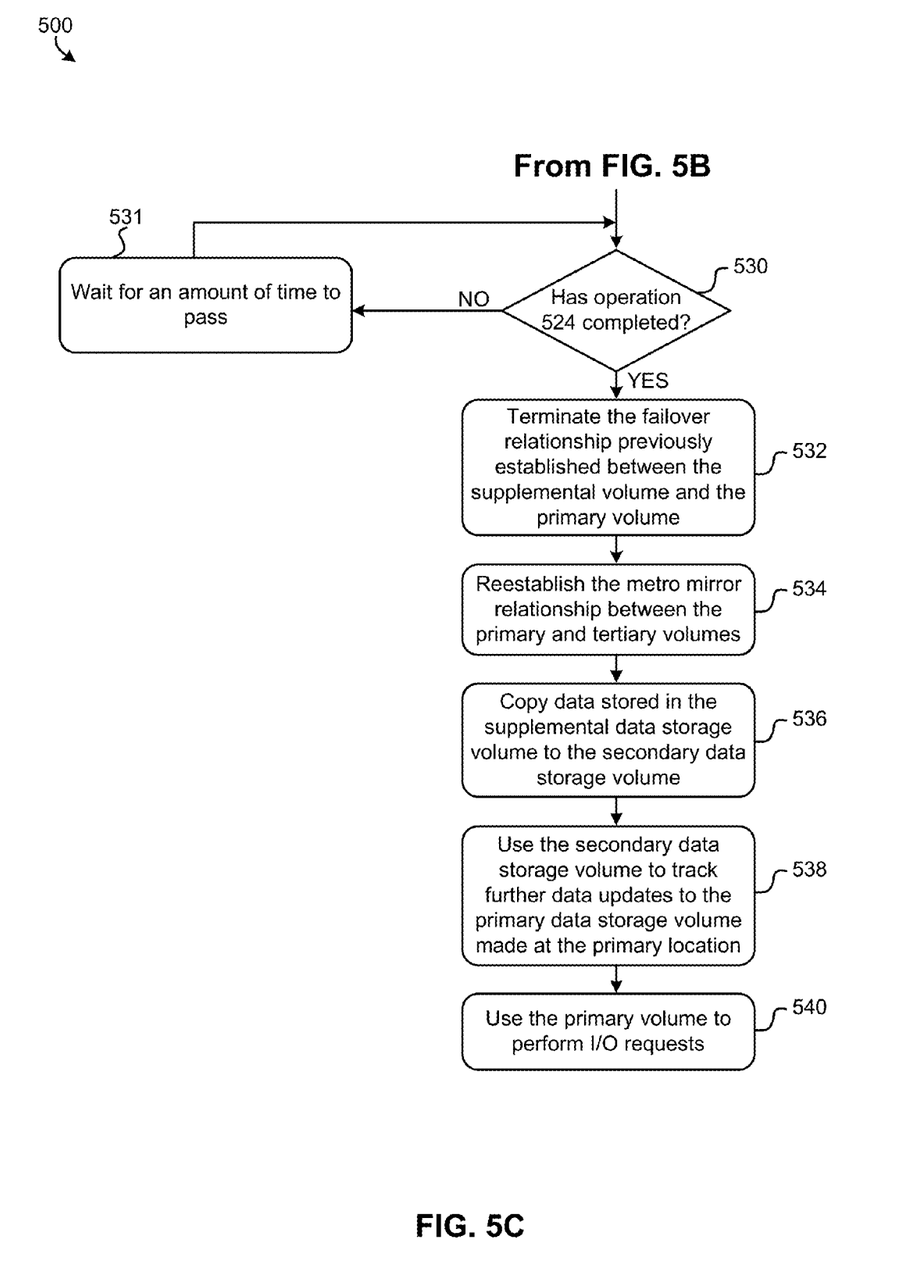

Looking to FIGS. 5A-5C, a flowchart of a method 500 is shown according to one embodiment. The method 500 may be performed in accordance with the present invention in any of the environments depicted in FIGS. 1-4, among others, in various embodiments. Specifically, FIGS. 5A-5C illustrate processes which may be performed in a data storage network, e.g., such as the one illustrated in the embodiment of FIG. 4. Accordingly, various process steps described in FIGS. 5A-5C have been described with reference to the various components of the data storage network illustrated in FIG. 4. It should also be noted that "data storage volumes" are also referred to below simply as "volumes" and are intended to be used interchangeably.

Of course, more or less operations than those specifically described in FIGS. 5A-5C may be included in method 500, as would be understood by one of skill in the art upon reading the present descriptions. Each of the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, operation 502 of method 500 includes detecting a failure event (e.g., a disaster) at a primary data storage location. In response to detecting the failure event, method 500 may perform operation 504 which includes pausing global mirror master operations for the data storage network (e.g., system). Moreover, operation 506 includes suspending the metro mirror relationship which exists between primary and tertiary volumes of the primary data storage location.

A failover relationship is then established between the secondary volume at the secondary data storage location and the primary volume at the primary data storage location. See operation 508. According to an illustrative approach, establishing the failover relationship may include initiating a bitmap at the secondary volume which may be used to track updates to the data stored on the primary volume which is currently offline. Once the failover relationship has been established, data updates which correspond to the primary volume may be sent to the secondary volume at the secondary volume, e.g., as a result of the failure condition at the primary location. Therefore, the failover relationship may be used to catalogue updates to be implemented on the data stored in the primary volume once the primary volume has been restored.

Method 500 further includes using entries stored in the journal at the secondary location to restore (e.g., reverse restore) data stored in the secondary data storage volume. See operation 510. Thus, the consistent copies of data stored in the journal may be used to update (e.g., verify and recover) the data stored in the secondary volume. According to one approach, data may be revert restored on the secondary volume by performing commit revert logic. Moreover, fast reverse restores of flash copy pairs may be performed to reverse restore the data on the secondary volume in some approaches, as would be appreciated by one skilled in the art upon reading the present description.

Optional decision 512 determines whether the reverse restore of operation 510 has completed, e.g., whether the secondary volume has been updated with all data stored in the journal. As shown, method 500 may progress to operation 513 in response to determining that the reverse restore operation has not been completed. Operation 513 includes waiting for an amount of time to pass, whereby method 500 returns to decision 512 to again determine whether the reverse restore operation has completed. It should be noted that in other approaches, operation 513 may include waiting for a predetermined condition to be met, for a user input/request, etc., depending on the desired embodiment.

Method 500 proceeds to optional operation 514 in response to determining that the reverse restore operation has completed, where a Flash copy relationship is established between the secondary volume and the journal. In some instances, performing one or more of the previous operations may remove the Flash copy relationship which preferably exists between the secondary volume and the journal. Therefore, it may be desirable that a Flash copy relationship is reestablished therebetween.

Looking to operation 516, all restored data is copied from the secondary data storage volume to the supplemental data storage volume, e.g., by performing a full copy. Accordingly, the supplemental volume may desirably be supplemented to include all of the updated data stored in the secondary volume. Furthermore, operation 518 of FIG. 5B includes establishing a failover relationship between the supplemental volume and the primary volume, preferably prior to implementing I/O requests. As mentioned above, the failover relationship may include initiating a bitmap, e.g., an out-of-sync (OOS) bitmap, in the supplemental volume which tracks updates which are intended to be made to the data stored on the primary volume which is currently offline. Therefore, the failover relationship may be used to catalogue updates to be implemented on the data stored in the primary volume once the primary volume has been restored.

Accordingly, operation 520 includes using the supplemental data storage volume to track a first set of data updates to the primary data storage volume at the primary location, e.g., by updating an OOS bitmap as described above. Thus, updates which may be received from a host (e.g., a user), are tracked at the supplemental volume, ultimately in response to the initial failure event at the primary location. Under normal operation, host updates are preferably not implemented at a data storage volume removed from the primary location. In other words, it is preferred that host updates are implemented on the primary data storage volume rather than the secondary data storage volume, e.g., to achieve higher efficiency. However, in some approaches this preference may be overwritten such that host updates are implemented at the secondary data storage volume in response to a failure at the primary location.

It follows that operations 502 through 520 may be used to recover operations at the secondary location, preferably such that received data storage operations are implemented as quickly as possible following a failure event at a primary data storage location.

Once the primary volume at the primary data storage location has been repaired and is able to process I/O requests, the data and tracked data updates that have accumulated at the secondary location are preferably transferred back to the primary volume such that further I/O requests can be implemented directly by the primary volume. As mentioned above, previous attempts to implement data stored at a given location back to another location were inefficient.

However, processes described herein improve the efficiency of repairing the data at a primary location following a failure. Looking to operation 522, method 500 includes retrieving a second set of tracked data updates stored in the secondary data storage volume at the secondary location, while operation 523 includes merging the second set of tracked data updates into the first set of tracked data updates in the supplemental data storage volume. According to one approach, the supplemental volume and secondary volume may be effectively paired, e.g., using an AND logical operation. In a preferred approach, operation 522 may be performed by merging the data stored in the OOS bitmaps of the secondary and supplemental volumes. Merging the tracked data updates desirably improves efficiency when copying the data back to the primary data storage volume, as will soon become apparent.

According to an in-use example, which is in no way intended to limit the invention, a system storage may desirably know which storage volumes are pairs at the secondary location, e.g., which may be provided by a user (e.g., customer), an administrator, determined using a procedure and/or any of the processes described herein, etc.

Operation 524 further includes transitioning (e.g., copying) the merged tracked data updates from the supplemental data storage volume at the secondary location to the primary data storage volume at the primary location, while operation 526 transitions (e.g., copies) the merged tracked data updates from the primary data storage volume to the tertiary data storage volume. Thus, a single set of merged data updates is received at the primary location from the supplemental volume at the secondary location.

By merging the changes tracked on the secondary and supplemental volumes, repeat copies of tracked changes are deduplicated, and a simplified list of tracked changes is achieved at the supplemental volume. Thus, the simplified list of tracked changes may be copied back to the primary volume from a single location, with a reduced number of duplicate copies, thereby improving efficiency of the system as a whole, particularly in view of operation 524 being performed over a long distance connection between the secondary and primary volumes. In such embodiments where the merged tracked changes are achieved at the supplemental volume and copied to the primary volume therefrom, the system may operate with the proviso that transitioning the merged data updates from the supplemental data storage volume to the primary data storage volume does not include copying data from the secondary data storage volume to the primary data storage volume. As a result, the amount of bandwidth, time, processing power, etc. that is consumed while copying the data back to the primary data storage volume is reduced, thereby improving overall performance.

Once received, it is preferred that the merged set of data updates are implemented in the primary volume at the primary location, e.g., in order to update the primary volume. Similarly, looking to operation 528, inputs to the storage system are quiesced at the supplemental volume, thereby temporarily deactivating the storage system such that the transition back to the primary volume is achieved without error.

Moreover, looking to FIG. 5C, Decision 530 determines whether all of the (merged) tracked data updates have transitioned from the data storage volumes at the secondary location to the primary data storage volume at the primary location. In other words, decision 530 determines whether operation 524 has been completed, e.g., such that all of the merged tracked data updates have been copied to the primary volume. According to one approach, decision 530 may be made by determining whether the OOS bitmaps of the supplemental volume and the primary volume are equal, e.g., are absent of any differences. For example, it may be determined that all of the merged tracked data updates have been copied to the primary volume in response to identifying that OOS bitmaps of the supplemental volume and the primary volume are equal.

As shown, method 500 may progress to operation 531 in response to determining that all of the merged tracked data updates have not yet been copied to the primary volume. Operation 531 includes waiting for an amount of time to pass, whereby method 500 returns to decision 530 to again determine whether operation 524 has been completed. It should again be noted that in other approaches, operation 531 may include waiting for a predetermined condition to be met, for a user input/request, etc., depending on the desired embodiment.

Method 500 proceeds to operation 532 in response to determining that all of the merged tracked data updates have been copied to the primary volume, where the failover relationship previously established (e.g., see operation 518) between the supplemental volume and the primary volume is terminated. According to one approach, the failover relationship may be terminated by deleting a bitmap, e.g., an out-of-sync (OOS) bitmap, at the supplemental volume which was previously used to track updates.

Moreover, the metro mirror relationship may be reestablished between the primary and tertiary volumes at the primary data storage location. See operation 534. Accordingly, all data stored in the primary volume is preferably copied to the tertiary volume at the primary location in response to implementing the received set of merged data updates in the primary volume. In one approach, the metro mirror relationship may be reestablished by removing the suspension placed on the relationship, e.g., see operation 506.

Method 500 further includes copying data stored in the supplemental data storage volume to the secondary data storage volume. See operation 536. Thus, operation 536 may include using the supplemental volume to reverse restore data on the secondary volume. According to one approach, the reverse restore may be performed by setting the secondary volume equal to the supplemental volume. As mentioned above, by merging the updates tracked by the secondary volume and the supplemental volume, redundant copy operations are avoided. This improvement is further outlined during operation 536 as the reverse restore operation may be performed over the short distance connection between the secondary and supplemental volumes, e.g., rather than over the long distance connection between the secondary and primary volumes. Thus, efficiency of the operation is improved and without sacrificing performance. Moreover, as mentioned above, data may be revert restored on the secondary volume by performing commit revert logic. According to some approaches, fast reverse restores of flash copy pairs may be performed to reverse restore the data on the secondary volume in some approaches, as would be appreciated by one skilled in the art upon reading the present description.

With continued reference to FIG. 5C, operation 538 includes resuming the failover relationship between the primary volume and the secondary volume by using the secondary data storage volume at the secondary location to track further data updates to the primary data storage volume made at the primary location. In other words, the secondary volume is again used to track updates to the data stored on the primary volume. As mentioned above, a failover relationship may include initiating a bitmap used to store the tracked updates. Secondary volume may also share data with the journal which may be used to periodically store consistent copies of data on the secondary volume. However, it is preferred that data is not copied from the secondary volume to the primary volume. In other words, operation 538 may be performed with the proviso that using the secondary data storage volume at the secondary location to track further host data updates to the primary data storage volume at the primary location does not include copying data from the secondary data storage volume to the primary data storage volume.

Furthermore, operation 540 includes using the primary volume at the primary location to perform I/O requests, e.g., from a host.

As described above, the processes of method 500 may be used for efficiently recovering to a secondary data storage location in response to a failure at a primary data storage location. Moreover, method 500 includes processes which may be used to return data storage operations to the primary data storage location in response to the failure being overcome, while maintaining efficiency during the transfer of data. Moreover, any one or more of the processes described herein may be implemented by using existing system storage commands as would be appreciated by one skilled in the art upon reading the present description.

Moreover, embodiments described herein may also implement "practice" functionality which may be used to practice recovering from a simulated failure event. According to an exemplary embodiment, which is in no way intended to limit the invention, one such configuration may allow a user to implement a Flash copy relationship off of the global mirror (GM) secondary volume, which can be used to "practice" a transfer of production to the secondary volume site while still maintaining DR capabilities. A point in time copy of the data may be taken while the remote copy replication is restarted during the practice tests. The practice functionality may also be desirable as it allows a user (e.g., customer) to practice how they would recover from a real failure event. This means that the same Flash copy target volumes used to perform the steps of a practice test, may be the same ones that used during a real production site switch there, e.g., following a failure condition. As a result, potential issues may be reduced by ensuring the set of volumes used during a real failure condition are the same set of volumes used during practice. Accordingly, any one or more of the processes described herein may be implemented during a data storage system "practice" failure operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   using, by a computer, a supplemental data storage volume at a secondary location to track a first set of data updates to a primary data storage volume at a primary location in response to a failure event at the primary location;
   retrieving, by the computer, a second set of tracked data updates to the primary data storage volume stored in a secondary data storage volume at the secondary location;
   merging, by the computer, the second set of tracked data updates into the first set of tracked data updates in the supplemental data storage volume, wherein merging the first and second sets of tracked data updated into merged data updates reduces a total size of the tracked data updates;
   transitioning, by the computer, the merged data updates from the supplemental data storage volume at the secondary location to the primary data storage volume at the primary location, wherein the reduced size of the merged data updates reduces an amount of processing power and bandwidth consumed by the computer during the transitioning; and
   using, by the computer, the secondary data storage volume at the secondary location to track further data updates to the primary data storage volume made at the primary location.

2. The method of claim 1, wherein using the secondary data storage volume to track further data updates to the primary data storage volume includes: copying data stored in the supplemental data storage volume to the secondary data storage volume.

3. The method of claim 1, wherein using the supplemental data storage volume to track the first set of tracked data updates to the primary data storage volume includes:
   using entries stored in a journal at the secondary location to restore data stored in the secondary data storage volume;
   copying the restored data from the secondary data storage volume to the supplemental data storage volume; and
   initiating a bitmap in the supplemental data storage volume, wherein the bitmap is used to track the first set of tracked data updates to the primary data storage volume.

4. The method of claim 3, wherein using entries stored in a journal at the secondary location to restore data stored in the secondary data storage volume includes performing fast reverse restore flash copies of the entries stored in the journal.

5. The method of claim 1, wherein using the supplemental data storage volume at the secondary location to track the first set of tracked data updates includes implementing a bitmap at the supplemental data storage volume, wherein the second set of tracked data updates to the primary data storage volume are stored on a bitmap in the secondary data storage volume.

6. The method of claim 5, wherein merging the second set of tracked data updates into the first set of tracked data updates includes: performing a logical AND operation on the first and second sets of tracked data updates.

7. The method of claim 1, with the proviso that using the secondary data storage volume at the secondary location to track further data updates to the primary data storage volume at the primary location does not include copying data from the secondary data storage volume to the primary data storage volume.

8. The method of claim 1, with the proviso that transitioning the merged data updates from the supplemental data storage volume at the secondary location to the primary data storage volume at a primary location does not include copying data from the secondary data storage volume to the primary data storage volume.

9. A computer program product comprising a computer readable storage medium having program instructions embodied therewith, the program instructions readable and/or executable by a computer to cause the computer to:
   use, by the computer, data storage volumes at a secondary location to track data updates to a primary data storage volume at a primary location in response to a failure event at the primary location, wherein the data storage volumes include a supplemental data storage volume and a secondary data storage volume;
   transition, by the computer, the tracked data updates from the data storage volumes at the secondary location to the primary data storage volume at the primary location using a longer distance connection;
   quiesce, by the computer, data updates to the primary data storage volume;
   determine, by the computer, whether all of the tracked data updates have transitioned from the data storage volumes at a secondary location to the primary data storage volume at the primary location;
   use, by the computer, a shorter distance connection between the supplemental data storage volume and the secondary data storage volume relative to the longer distance connection to copy data stored in the supplemental data storage volume to the secondary data storage volume in response to determining that all of the tracked data updates have transitioned from the data storage volumes at the secondary location to the primary data storage volume at the primary location, wherein using the shorter distance connection between the supplemental data storage volume and the secondary data storage volume reduces an amount of processing power and bandwidth consumed by the computer during the copying; and
   use, by the computer, the secondary data storage volume at the secondary location to track further data updates to the primary data storage volume made at the primary location.

10. The computer program product of claim 9, wherein using the data storage volumes at the secondary location to track data updates to a primary data storage volume at a primary location in response to a failure event at the primary location includes:
    using entries stored in a journal at the secondary location to restore data stored in the secondary data storage volume;
    copying the restored data from the secondary data storage volume to the supplemental data storage volume; and
    initiating a bitmap in the supplemental data storage volume, wherein the bitmap is used to track a first set of data updates to the primary data storage volume and is stored in the supplemental data storage volume at the secondary location.

11. The computer program product of claim 10, wherein using entries stored in a journal at the secondary location to restore data stored in the secondary data storage volume includes performing fast reverse restore flash copies of the entries stored in the journal.

12. The computer program product of claim 10, wherein transitioning the tracked data updates from the data storage volumes at the secondary location to the primary data storage volume at the primary location includes:
retrieving a second set of tracked data updates to the primary data storage volume stored in a secondary data storage volume at the secondary location; and
merging the second set of tracked data updates into the first set of tracked data updates in the supplemental data storage volume,
wherein the merged data updates are transitioned form the data storage volumes at the secondary location to the primary data storage volume at the primary location.

13. The computer program product of claim 12, wherein the second set of tracked data updates to the primary data storage volume are stored on a bitmap in the secondary data storage volume, wherein merging the second set of tracked data updates into the first set of tracked data updates includes: performing a logical AND operation on the first and second sets of tracked data updates.

14. The computer program product of claim 12, with the proviso that transitioning the tracked data updates from the data storage volumes at the secondary location to the primary data storage volume at the primary location does not include copying data from the secondary data storage volume to the primary data storage volume.

15. The computer program product of claim 9, with the proviso that using the secondary data storage volume at the secondary location to track further data updates to the primary data storage volume at the primary location does not include copying data from the secondary data storage volume to the primary data storage volume.

16. A computer-implemented method, comprising:
sending, by a computer, data updates to a secondary data storage volume at a secondary location in response to a failure event at a primary location, wherein the data updates correspond to a primary data storage volume at the primary location;
receiving, by the computer, a single set of merged data updates from a supplemental data storage volume at the secondary location, wherein the single set of merged data updates includes data updates from the first set of data updates and a second set of data updates, wherein the single set of merged data updates has a reduced total size compared to a combined size of the first and second sets of data updates;
implementing, by the computer, the received single set of merged data updates in the primary data storage volume at the primary location, wherein the reduced size of the single set of merged data updates reduces an amount of processing power and bandwidth consumed by the computer during the implementing;
quiescing, by the computer, data updates to the primary data storage volume;
copying, by the computer, data stored in the primary data storage volume to a tertiary data storage volume at the primary location;
determining, by the computer, whether all of the merged data updates have been implemented in the primary data storage volume;
receiving, by the computer, data updates to the primary data storage volume in response to determining that all of the merged data updates have been implemented in the primary data storage volume; and
sending, by the computer, the received data updates to the secondary data storage volume at the secondary location.

17. The method of claim 16, wherein a short distance, synchronous relationship exists between the primary data storage volume and the tertiary data storage volume.

18. The method of claim 16, with the proviso that the primary data storage volume does not receive data updates from the secondary data storage volume at the secondary location.

19. The method of claim 16, wherein a long distance, asynchronous copy relationship exists between the primary data storage volume and the secondary data storage volume.

20. The method of claim 16, with the proviso that sending further data updates to the secondary data storage volume at the secondary location does not include copying data from the secondary data storage volume to the primary data storage volume.

* * * * *